United States Patent [19]

Flynn

[11] Patent Number: 4,512,888

[45] Date of Patent: Apr. 23, 1985

[54] APPARATUS FOR REMOVAL BY FLOTATION OF SOLID PARTICLES FROM LIQUID

[75] Inventor: Peter J. Flynn, North Attleboro, Mass.

[73] Assignee: Bird Machine Company, Inc., South Walpole, Mass.

[21] Appl. No.: 394,290

[22] Filed: Jul. 1, 1982

[51] Int. Cl.³ .............................................. B03D 1/24
[52] U.S. Cl. ................................ 210/221.2; 209/168; 366/107; 366/338
[58] Field of Search ................ 210/150, 221.1, 221.2, 210/703, 220; 209/168, 170; 261/DIG. 75, 62, 124; 162/322, 342, 380; 239/407, 417.5; 366/107, 338

[56] References Cited

U.S. PATENT DOCUMENTS

| | | |
|---|---|---|
| 1,677,265 | 7/1928 | Boving . |
| 2,066,544 | 1/1937 | Shaw ..................... 261/62 |
| 3,038,538 | 6/1962 | Logan et al. ............ 162/342 |
| 3,256,802 | 6/1966 | Karr ........................ 99/275 |
| 3,284,064 | 11/1966 | Kolm et al. .............. 261/62 |
| 3,489,396 | 1/1970 | D'Aragon ................. 261/25 |
| 3,556,489 | 1/1971 | Kitakyushu ............... 261/62 |
| 3,641,362 | 6/1933 | Remick ..................... 209/168 |
| 3,949,025 | 4/1976 | Englert et al. ............ 261/62 |
| 4,051,204 | 9/1977 | Muller et al. ............. 261/DIG. 75 |
| 4,065,385 | 12/1977 | Aktay et al. .............. 210/703 |
| 4,186,094 | 1/1980 | Hellberg . |
| 4,198,359 | 4/1980 | Todd ........................ 210/230 |
| 4,308,138 | 12/1981 | Woltman ................... 261/DIG. 75 |
| 4,328,107 | 5/1982 | Wright ...................... 210/221.2 |
| 4,347,128 | 8/1982 | Barnscheidt . |

FOREIGN PATENT DOCUMENTS

| | | | |
|---|---|---|---|
| 7522875 | 4/1976 | France ...................... 261/124 |
| 52-42643 | 2/1977 | Japan ........................ 210/221.2 |
| 55-50699 | 12/1980 | Japan ........................ 261/62 |

Primary Examiner—Richard V. Fisher
Assistant Examiner—W. Gary Jones
Attorney, Agent, or Firm—Edgar H. Kent

[57] ABSTRACT

A flotation cell for removal of solid particles contained in a liquid has, upstream of its inlet, a mixing chamber providing a passage through which the liquid passes to the cell inlet and in which the liquid is charged with air or other gas to form bubbles therein. This chamber is provided with at least one pair of opposed, converging walls extending across the passage to form opposite faces of a liquid flow path to a restricted gap between these walls at their greatest convergence, and so arranged that substantially all the liquid flowing through the chamber is forced to pass through such a flow path. Gas injection means provides a flow of gas under super-atmospheric pressure into the liquid flowing between these walls in the vicinity of the restricted gap between them to form bubbles in the liquid distributed across the path of flow.

16 Claims, 4 Drawing Figures

U.S. Patent  Apr. 23, 1985  4,512,888
FIG 1
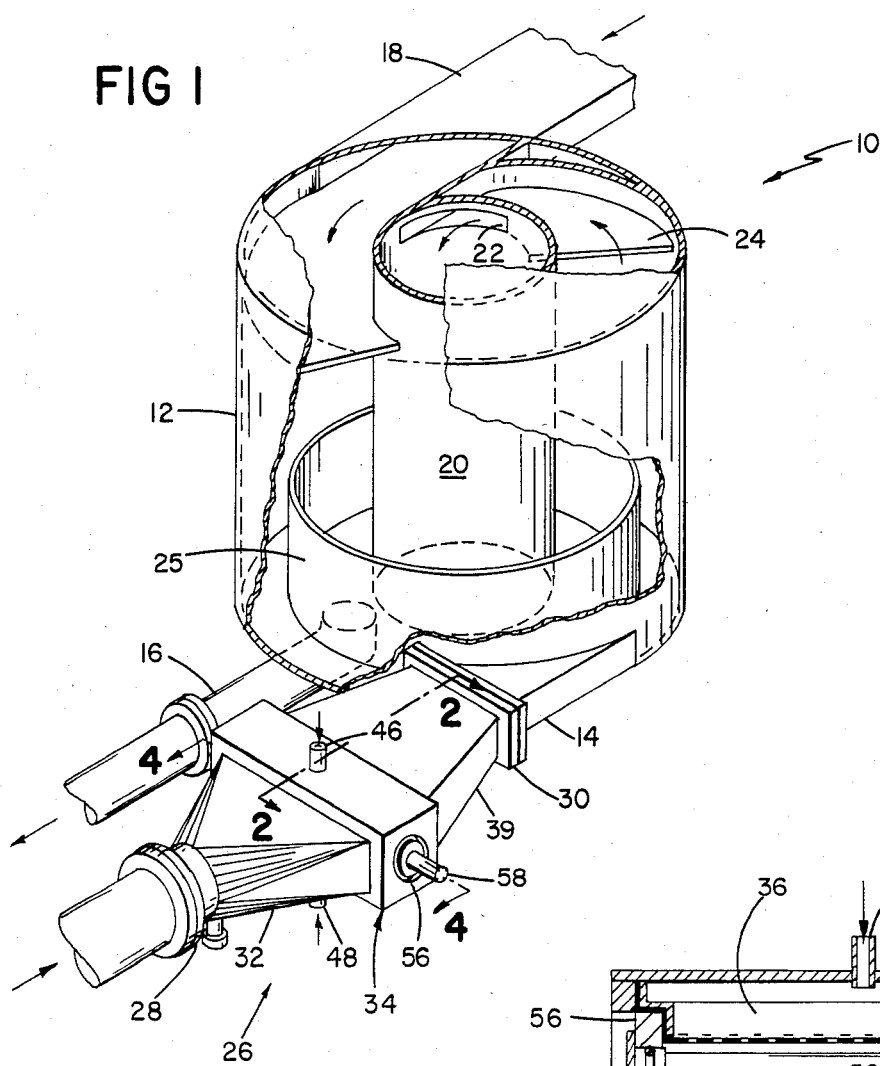
FIG 4
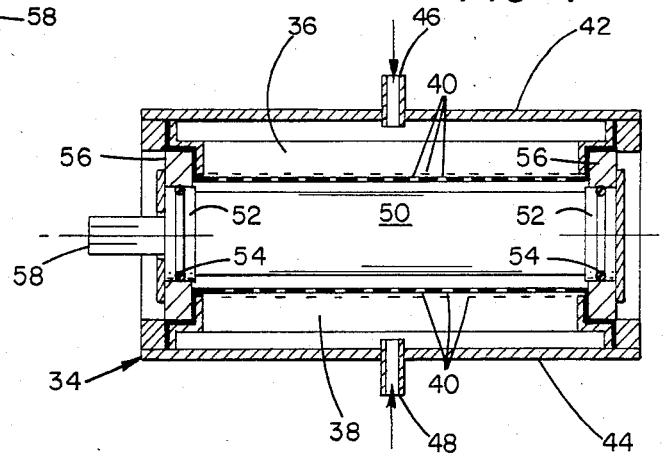
FIG 3
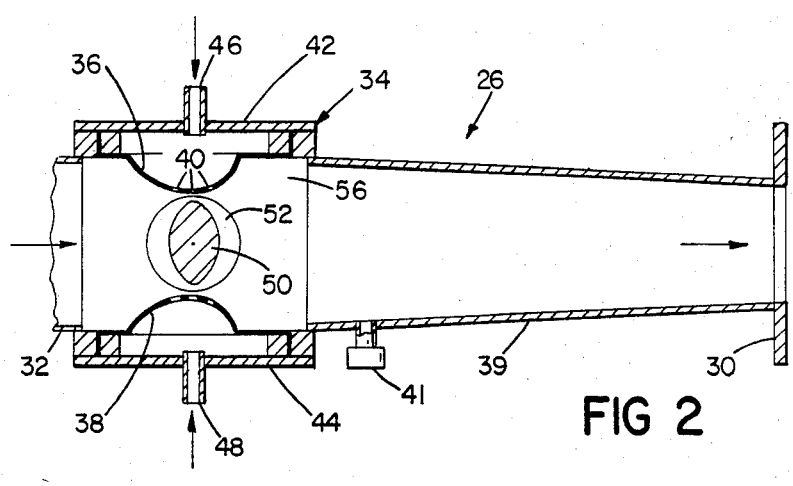
FIG 2

APPARATUS FOR REMOVAL BY FLOTATION OF SOLID PARTICLES FROM LIQUID

FIELD OF THE INVENTION

The invention relates to apparatus for removing solid particles contained in a liquid by flotation.

BACKGROUND OF THE INVENTION

Impurities in the form of solid particles contained in a liquid (for example, ink in recycled-paper pulp suspension) can be removed by injecting gas (usually air) into the liquid to form bubbles, permitting the gas bubbles (to which the impurities attach on their surfaces) to rise to the surface of the liquid so as to form a foam, and removing the foam floating on the surface of the liquid. For example, Hellberg U.S. Pat. No. 4,186,094 describes deinking apparatus employing an air injector in which the pulp suspension is forced to flow through a passage between concentric cones or between flat plates, and air is injected into the suspension through pores in a cone or a plate.

SUMMARY OF THE INVENTION

In general the invention features apparatus for removing solid particle impurities in a liquid including a chamber for forming and mixing gas bubbles in the liquid. The chamber has a flow passage that decreases in one cross-dimension progressively between converging walls to a restricted gap betweem them at and approximately at their greatest convergence, and pressurized air or other gas is forced into the liquid substantially at the restricted gap. Preferably, one of the walls is adjustably positioned for movement to vary the size of the restricted gap between them, and the walls are extended in a direction transverse to the direction of flow to provide a thin, relatively wide flow zone of substantially uniform thickness into which the gas is injected and in which the flow velocity is accelerated by diminished cross-section, and the boundary layer adjacent the walls is thereby thinned, providing favorable conditions for bubble formation in the liquid by the injected gas. Preferably, also, the restricted gap is of short length in the direction of flow and similar short height compared to its width transverse to the direction of flow and the flow passage enlarges abruptly immediately after the restricted gap, rapidly enlarging the flow path to provide turbulence, which thoroughly distributes the bubbles in the liquid mix. Wall adjustment provides variable control of accelerated flow and bubble size.

In a preferred embodiment the mixing chamber includes two pairs of opposite curved walls to form two flow zones through each of which half of the liquid is forced to pass through the restricted gap between the walls. The curved converging nature of the walls accelerates the liquid and provides a substantially uniform velocity profile at the point of gas injection. There are at least two adjustable walls that are adjacent to each other and are connected for rotation about a common axis between the other walls of the pairs to provide the adjustability, the adjustable walls being opposite halves of a substantially oval cross section member that is pivotally mounted. Preferably, there are apertures in at least one wall of a pair for gas injection on the order of 1/32 inch (0.8 mm) or slightly smaller in diameter, and the apertures are provided in one to three rows disposed transversely to the direction of liquid flow through the corresponding gap to which they are adjacent.

DESCRIPTION OF THE PREFERRED EMBODIMENT

The structure and operation of the presently preferred embodiment of the invention will now be described after first briefly describing the drawings.

DRAWINGS

FIG. 1 is a perspective view, partially broken away, of particle removal apparatus according to the invention.

FIG. 2 is a vertical cross-sectional view taken at 2—2 of FIG. 1, of a portion of the mixing chamber of FIG. 1.

FIG. 3 is a fragmentary view of FIG. 2, showing a changed position of a part.

FIG. 4 is a vertical sectional view, taken at 4—4 of FIG. 1, of said mixing chamber.

STRUCTURE

Referring to FIG. 1, there is shown deinking apparatus 10 for removing solid ink particle impurities on a pulp suspension including recycled paper. Apparatus 10 includes flotation cell 12 with inlet 14 at its bottom for defibered, chemically-pretreated paper pulp in the form of a liquid suspension, outlet 16 for removing cleaned liquid from the cell, inlet 18 for receiving air from a blower, and central cylindrical passage 20 into which ink-containing foam is blown through hole 22 next to skimmer 24 for removal from flotation cell 12. Inlet 14 is separated from outlet 16 by cylindrical baffle 25. Connected to inlet 14 is mixing chamber 26 for injecting gas bubbles into, and mixing them with, the paper pulp suspension.

Mixing chamber 26 will now be described in more detail, with reference to FIGS. 1–4. The chamber 26 has an inlet 28 of conventional round cross-section matching conventional piping from the source of liquid mix being processed. Inlet 28 opens into a duct 32 which expands in horizontal width in the direction of flow to about three times the inlet 28 diameter as duct 32 enters box frame 34 in which gas is injected into the liquid. As can be seen from FIG. 1, duct 32 gradually changes in cross-section from round at inlet 28 to progressively wider flat top and bottom with rounded sides, becoming rectangular adjacent frame 34, thus providing a smooth transition flow path between round and rectangular cross-sections.

Within frame 34 are mounted walls 36, 38 which are oppositely curved and have their axes disposed transversely to the path of flow, these walls 36, 38 having sealed connection to covers 42, 44 of frame 34. Downstream of walls 36, 38 and frame 34, duct 39 of substantially rectangular cross-section diminishes in horizontal width and to a lesser extent in height to a rectangular flange 30 by which it is connected to the mating flange of rectangular cross-section inlet 14 of apparatus 10. Duct 39 is provided with a plugged drain pipe 41 in its bottom wall, and a like drain pipe (not shown) may be provided in the bottom wall of duct 32. A hydrofoil 50 having a substantially oval cross-section is mounted for rotation transversely of the flow passage between walls 36, 38 to provide two adjustable flow passages between hydrofoil 50 and curved walls 36, 38. Hydrofoil 50 has enlarged circular ends 52 rotatably mounted in corresponding circular openings in the end walls 56 of frame 34, with O-rings 54 providing a seal between ends 52 and walls 56.

A hexagonal shaft 58 is connected to one end of hydrofoil 50 to permit attachment of a hand wheel or other pivoting device (not shown) preferably provided with a position index. Hydrofoil 50 may thus be pivoted through substantially 90° between the position with its major axis vertical (FIG. 2) and the position with its major axis horizontal (FIG. 3), providing, at each adjusted position, a restricted gap between hydrofoil 50 and the adjacent wall 36, 38 of variable height depending on the adjustment. Curved walls 36, 38 have distributed along their lengths apertures 40 for injecting into the pulp mix gas (usually air) under superatmospheric pressure which is supplied by connections to a compressor or other source (not shown) through ports 46, 48 in covers 42, 44 to the inside of walls 36, 38.

In the embodiment shown, there are three rows of apertures 40 in each wall 36, 38, the apertures are about 1/32 inch (0.8 mm.) in diameter spaced 0.2 inch (5.1 mm.) apart located approximately at the restricted gap at different adjusted positions of hydrofoil 50. The two restricted gaps in each case are about ¼ inch (6 mm.) in smallest height in the position of FIG. 2 and about 1 inch (25 mm.) in largest height in the position of FIG. 3, decreasing from 1 inch as the hydrofoil is turned from the position in FIG. 3 to the position of FIG. 2. However, for greater brightness of resulting product at each adjustment, it is presently preferred to make these two gaps smaller, such as about ⅛ inch (3 mm.) smallest height and about ½ inch (12.5 mm.) largest height, respectively. The length of the restricted gap in the direction of flow is short, approximating its height at the various adjustment positions of the hydrofoil. The mixing chamber has a length of about 48 inches (1220 mm.) from its inlet flange to its outlet flange, inlet 28 has an inner diameter of 8.33 inch (212 mm.) expanding laterally in duct 32 to approximately 24 inches (610 mm.) at frame 34, which is approximately the width of the restricted gap transverse to the direction of flow.

OPERATION

In the operation of flotation cell 12 to remove solid particle materials, the liquid pulp mix, charged with gas bubbles in mixing chamber 26, is admitted to the cell through inlet 14. The bubbles, to which solid particle impurities have attached, rise to the surface in the cell where the foam is blown off of the surface into passage 20 from which it is removed while the clean liquid, with reduced ink content, is removed from the lower portion of the flotation cell through outlet 16.

Turning to the gas injection and bubble formation in mixing chamber 26, gas is injected through holes 40 under pressure, usually air in a range of about 10 to 20 p.s.i.g., as the pulp is forced to pass between walls 36, 38 and hydrofoil 50 first as they converge to the restricted gap, then as they more abruptly diverge. When hydrofoil 50 is in the position of FIG. 3, the flow area at the restricted gaps is slightly less than that of the circular passage at inlet 28 with the approximately 1 inch (25 mm.) high gap. When hydrofoil 50 is rotated away from this wide open position, the flow area at the gap decreases with increasing resultant flow velocity up to about four times the flow velocity at inlet 28 when hydrofoil 50 is generally in the position of FIG. 2 with the approximately ¼ inch (6 mm.) high gap and about eight times the inlet flow velocity with the approximately ⅛th inch (3 mm.) high gap. In general, other conditions being equal, increase in flow velocity will tend to decrease bubble size, the optimum bubble size being a variable depending on the makeup of the liquid or pulp mix being treated and other conditions. Adjustment to increase flow velocity also reduces the thickness of the liquid mix layer as it is being injected with gas, improving bubble shearing action, then penetration and dispersion at a given gas pressure. The facility for making such adjustments provided by the preferred embodiment is an important attribute thereof.

Because the gas addition occurs through drilled holes (as opposed to sintered metal), it has a high injection velocity to permit penetration into the liquid, and because walls 36, 38 extend in a direction transverse to the direction of flow, flow volume restriction and acceleration between them take place in a much shorter zone than is the case with long opposed surfaces in the direction of flow, as in U.S. Pat. No. 4,186,094 aforesaid. Because the flow area between walls 36, 38 and curved hydrofoil 50 is streamlined, pressure losses are kept low.

Walls 36, 38 diverge more abruptly after the restricted gap between them than they converge up to that gap, thereby providing fast expansion of the fluid stream and desirable turbulence and mixing in passage 39 which also provides additional contact/mixing as the flow contracts in cross-section as it proceeds toward cell inlet 14. Hydrofoil 50 can be rotatably adjusted by external shaft 58 to adjust the restricted gap between walls 36, 38, to thereby provide liquid flow rates in the gas injection zone that are variable over a wide range to optimize bubble size and distribution for given conditions and to provide for easy removal of any clogged solid material.

The apparatus shown may be used singly or in multiple sets, connected to the source of liquid mix in parallel for single treatment, or connected in series for successive gas injection and flotation treatments of accepts from a preceding cell. The apparatus is designed for ease of assembly in multiple, either side by side or vertically stacked.

OTHER EMBODIMENTS OF THE INVENTION

Other embodiments of the invention will become apparent to those skilled in the art. By way of example only, a few are mentioned.

The adjustability of hydrofoil 50 is most desirable, but, if that is not needed, the same configuration, with hydrofoil 50 fixed is still advantageous, and may be readily utilized to provide gas injection from opposite sides. Thus hydrofoil 50 may be hollow with its interior connected to a compressed gas source and with gas discharge apertures opposite the apertures 40 in walls 36, 38, so that the flow is injected with gas from both sides. To do this with the adjustable hydrofoil is more difficult. Hydrofoil 50 could be omitted altogether, the distance between walls 36, 38 being shortened as desired by enlarging their diameters or by reducing the maximum height of the flow passage through chamber 26. In such case one of the walls 36, 38 could be made adjustable toward and away from the other, for example, by hinging at one end, with suitable sealing if gas is injected through the adjustable wall. For larger flow capacities, walls 36, 38 could be moved further apart, a pipe with apertures on either side connected to the compressed gas source could be located centrally between them and two hydrofoils 50, one between each wall and one perforated face of the pipe, could be provided to form four gas injectiion zones like the two shown.

The size and number of rows of apertures 40 are preferred, not critical. Regular openings rather than those provided by the pores of porous metal appear to provide more regularity of bubble size and distribution. One to three rows of the apertures of the preferred diameter were found to provide adequate aeration, so that one to three rows is preferred. Size of the apertures has an effect on bubble size and may vary according to what is desired in that respect, although velocity of the flow past the apertures is more significant in determining bubble size. The oval shape of hydrofoil 50 is also preferred but not critical.

It should be appreciated that the restricted gap height adjustment ranges mentioned are illustrative. The largest adjusted height will be used generally for clearing any obstruction that may occur at a lesser adjusted height. The smallest adjusted height may vary from even less than ⅛ inch (3 mm.) (where this will not cause too frequent plugging), to even more than ¼ inch (6 mm.) (at higher inlet flow pressures than above indicated or where acceptable brightness is thereby achieved).

What is claimed is:

1. In apparatus for removal by flotation of solid particles contained in a liquid, which apparatus comprises a flotation cell having means defining an inlet for liquid to be treated, a first outlet for foam containing solid particles and a second outlet for cleaned liquid, and, upstream of said inlet, wall means defining a mixing chamber having a passage through which liquid passes before proceeding to said inlet and in which said liquid is charged with gas to form bubbles therein, the improvement wherein said wall means comprises a pair of opposed walls extending across said passage to form, with other said wall means, opposite faces of a flow path for liquid in said chamber of generally rectangular cross-section, said pair of walls converging to a restricted gap at their greatest convergence, said pair of walls diverging after said gap, and gas injection means for providing a flow of gas under super-atmospheric pressure into the liquid as it flows through said restricted gap to form bubbles in the liquid distributed across the path of flow.

2. Apparatus according to claim 1 wherein the length of said restricted gap in the direction of flow is approximately equal to its height.

3. Apparatus according to claim 1 which further includes means for adjustably varying the position of one of said pair of walls of each set relative to the other to vary the cross-sectional area of said restricted gap.

4. Apparatus according to claim 3 wherein said mixing chamber includes two pairs of said opposed walls forming two of said flow paths through each of which substantially half of the liquid flowing through said chamber is forced to pass, and wherein the adjustable wall of each pair is curved about an axis transverse to the flow path, and said curved walls are connected for pivoting about a common axis between the other walls of said pairs to effect said adjustability.

5. Apparatus according to claim 4 wherein said adjustable walls are the opposite halves of a substantially oval cross-section member.

6. Apparatus according to any of claims 1–5 wherein said gas injection means includes apertures through at least one of each pair of said walls adjacent said restricted gap.

7. Apparatus according to claim 6 wherein said apertures are of the order of 1/32nd inch in diameter.

8. Apparatus according to claim 7 wherein each apertured wall has 1 to 3 rows of said apertures disposed transversely to the direction of liquid flow past them.

9. Apparatus according to any of claims 3–5 wherein the shortest distance between each said pair of walls at said restricted gap at any adjusted position of said adjustable wall is in the range of approximately ⅛th inch to ¼th inch.

10. Apparatus according to claim 9 wherein the largest distance between each said pair of walls at said restricted gap at any adjusted position of said adjustable wall is in the range of approximately ½ inch to 1 inch.

11. Apparatus according to claim 10 wherein the length of said restricted gap in the direction of flow is approximately equal to its height at any adjusted position of said adjustable wall.

12. Apparatus according to any of claims 3–5 wherein the cross-sectional area of the passage between each said pair of walls at said restricted gap for at least one adjusted position of said adjustable wall is sufficiently less than the cross-sectional area of the inlet to said chamber to cause the liquid flow to be forced through said gap at a velocity at least about four times greater than the velocity of its flow at said chamber inlet.

13. Apparatus according to any of claims 3–5 wherein the cross-sectional area of the passage between each said pair of walls at said restricted gap for at least one adjusted position of said adjustable wall is sufficiently less than the cross-sectional area of the inlet to said chamber to cause the liquid flow to be forced through said gap at a velocity at least about eight times greater than the velocity of its flow at said chamber inlet.

14. Apparatus according to any of claims 1 to 5 wherein said mixing chamber provides a flow path for the liquid toward said walls which progressively enlarges in and transversely to the direction of flow.

15. Apparatus according to claim 14 wherein said mixing chamber provides a flow path for the liquid away from said walls which progressively contracts in and transversely to the direction of flow.

16. Apparatus according to claim 1 wherein said pair of walls diverge after said gap to substantially the same extent as said walls converge before said gap.

* * * * *

UNITED STATES PATENT AND TRADEMARK OFFICE
CERTIFICATE OF CORRECTION

PATENT NO. : 4,512,888
DATED : April 23, 1985
INVENTOR(S) : Peter J. Flynn

It is certified that error appears in the above-identified patent and that said Letters Patent are hereby corrected as shown below:

Col. 2, line 24, change "on" to --in--.

Col. 5, claim 3, line 48, delete "of each set".

Signed and Sealed this

Eighth Day of October 1985

[SEAL]

Attest:

DONALD J. QUIGG

Attesting Officer

Commissioner of Patents and
Trademarks—Designate